Aug. 14, 1934.   J. L. CREVELING   1,970,279
LUBRICATING DEVICE
Filed Sept. 17, 1931   3 Sheets-Sheet 1
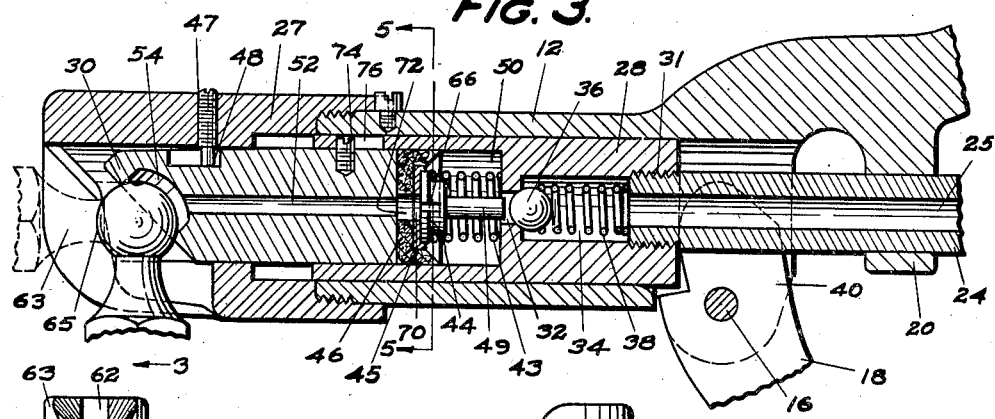
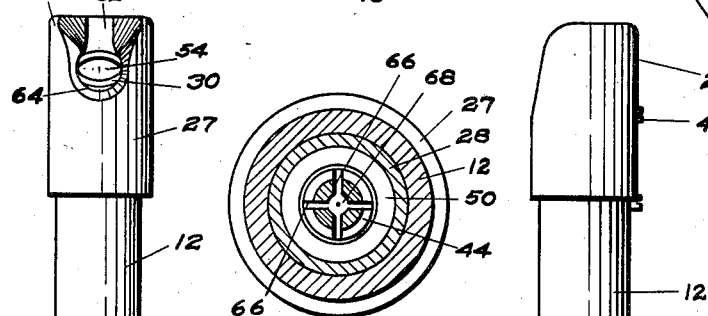
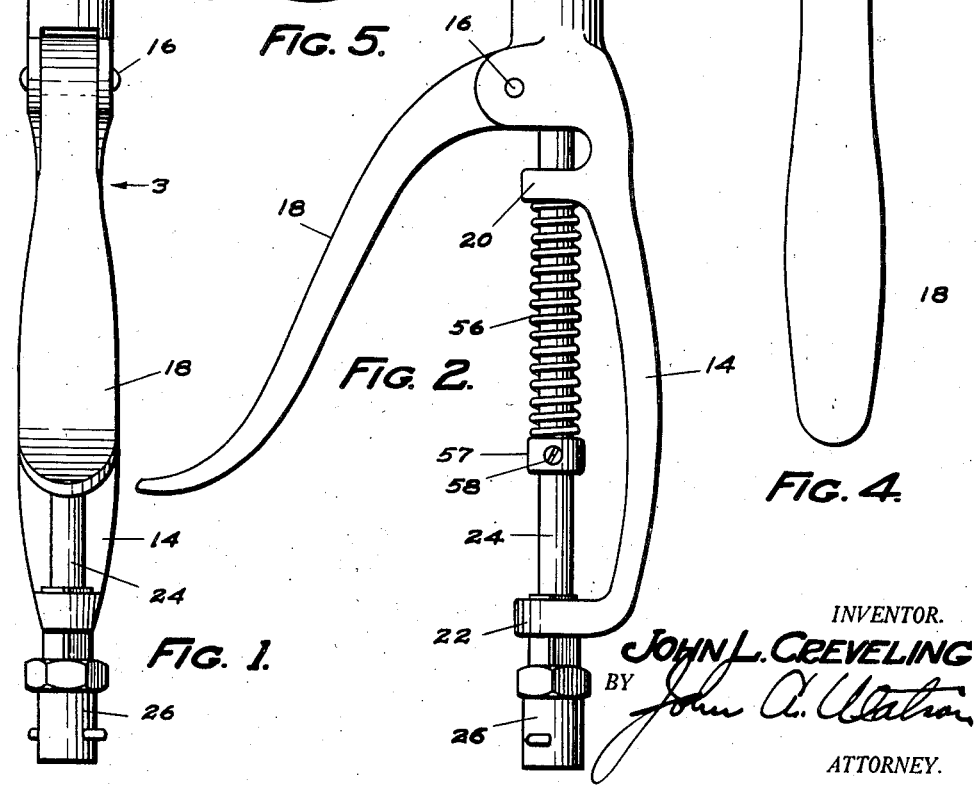
INVENTOR.
JOHN L. CREVELING
BY
ATTORNEY.

Aug. 14, 1934.  J. L. CREVELING  1,970,279
LUBRICATING DEVICE
Filed Sept. 17, 1931   3 Sheets-Sheet 2

INVENTOR.
JOHN L. CREVELING
BY
ATTORNEY.

Aug. 14, 1934.   J. L. CREVELING   1,970,279
LUBRICATING DEVICE
Filed Sept. 17, 1931   3 Sheets-Sheet 3

INVENTOR.
JOHN L. CREVELING
BY
ATTORNEY.

Patented Aug. 14, 1934

1,970,279

UNITED STATES PATENT OFFICE 1,970,279

LUBRICATING DEVICE

John L. Creveling, Tucson, Ariz., assignor to The Lubrication Corporation, South Bend, Ind., a corporation of Delaware Application September 17, 1931, Serial No. 563,408

15 Claims. (Cl. 221—47.4)

This invention relates to lubrication devices and more particularly to such devices of the character in which a fitting is firmly held within a coupling device while grease or other lubricant is being supplied through said coupling device to said fitting.

One of the objects of my invention is the provision of a new and improved coupling device capable of efficient action which is at the same time comparatively simple and relatively inexpensive in its construction.

A further object of the invention is a provision of a coupling device which is relatively convenient for use in supplying lubricant to fittings or other lubricant receptacles regardless of the inconvenience of the location of the receptacles.

A further object is the provision of a coupling device in which a single manual operation serves to couple the device to the lubricant receptacle and at the same time to open a valve to allow lubricant to be supplied.

Further objects will be apparent from a reading of the subjoined specification and claims and from a consideration of the accompanying drawings.

In order to explain the invention more clearly, several embodiments thereof are shown in said drawings, in which:

Figure 1 is a view in elevation of a novel coupling device constructed according to my invention;

Figure 2 is another view in elevation of the coupling device shown in Figure 1 taken substantially at right angles to the view of Figure 1;

Figure 3 is a view in section on an enlarged scale of part of the device shown in Figure 1 taken substantially on the line 3—3 of Figure 1, a fitting to be lubricated also being shown in two positions adjacent to the coupling;

Figure 4 is a view in elevation of one of the handles shown in Figure 1 looking in the direction opposite to that in which the view of Figure 1 is taken;

Figure 5 is a view in section taken substantially on the line 5—5 of Figure 3, the spring being omitted for clearness;

Figure 6:
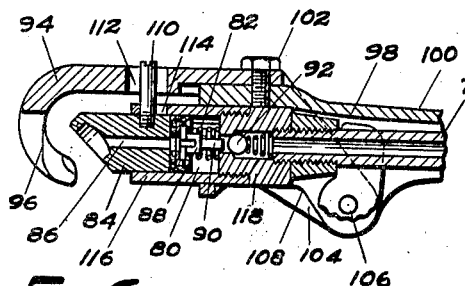
Figure 6 is a sectional view of a portion of a different form of coupling device, parts of the handles, etc., being broken away.

In general the device disclosed in Figures 1 to 5, inclusive, is a preferred embodiment of my invention and comprises a coupler to be used for servicing nipples or other lubricant receiving fittings by which bearings and other moving parts may be lubricated.

In form, the coupler shown in Figs. 1 to 5, inclusive, resembles a pair of pliers and is adapted to be connected to a source of lubricant under pressure by any suitable means. It is provided with a longitudinal bore extending substantially throughout its length through which lubricants including grease may pass and formed as a part of itself is a clamping device by which the coupler may be secured to the nipple to be lubricated. It is provided with a manually operated valve controlling the supply of lubricant through the bore and with a piston connected with the clamping device for utilization of the pressure on the lubricant to aid in clamping the coupler to the nipple, if such be desired. Compression of the handles is adapted to clamp the fitting within the coupler and also to open the grease control valve.

Referring particularly to Figs. 1 to 5, inclusive, of the drawings, I have shown a main casing 12 provided with an integral depending handle 14, the latter being adapted to be held by the operator in the palm of his hand. Pivotally mounted on the casing 12 by means of the pin 16 is a co-operating handle 18 which is adapted to be grasped by the operator with the fingers and drawn toward the handle 14 for operating the valve and clamp, as will be hereinafter more particularly described. The depending part 14 of the casing 12 is provided with a pair of guides 20 and 22, the former being provided with a circular opening through which a pipe 24 is adapted to extend and at times to slide. The pipe 24 has a central passageway or bore 25 which serves as a lubricant conduit. The lower end thereof is provided with a coupling joint 26 which may be of the bayonet type and by means of which the pipe is adapted to be secured to a source of lubricant supply under pressure. The upper part of the joint 26 is square in cross-section and is adapted to extend through a cooperating square opening formed in the guide 22. Lubricant may be conveyed through the pipe 24 from the source of supply outward into the main portion of the casing 12.

Means are provided for positioning the fitting to be lubricated in the outer end of the casing or coupling member and for controlling the passage of lubricant through the coupler to the fitting. The main portion of the casing 12 is provided with an extension formed by the clamping member or sleeve 27 which is screwed onto the outer end of the casing 12. Within the casing 12 and the sleeve 27 there is normally positioned a pair of bored plungers 28 and 30, the rearward plunger 28 having internal screw threads 31 by which it is secured to the forward end of the pipe 24. The sleeve 27, as will later be more fully described, co-operates with the plunger or nozzle 30 for the purpose of clamping the coupler to the nipple to be supplied with lubricant. The plunger 28 is provided with a bore 32 substantially aligned with the bore 25 of the conduit 24 and also with an enlarged bore 34 intermediate the bore 32 and the junction of the plunger 28 with the conduit 24. Within this last named enlarged bore 34 there is positioned a ball check valve 36 adapted to seat upon a valve seat at the entrance to the bore 32 and normally held upon said seat by means of a compression spring 38 bearing at one end on the ball valve 36 and bearing at its opposite end upon the adjacent extension of conduit 24. The handle 18 is provided with a pair of extensions 40 and 42 (see Figure 4) which are both shaped in the same manner as extension 40 is shown in Figure 3 to form cams which act upon the rearward end of the plunger 28 to urge the plunger 28 forward relative to the casing 12 and to the sleeve 27. The plunger 30 will normally (unless a fitting to be lubricated is held in the coupler) move simultaneously with the plunger 28 forward relative to the sleeve 27 inasmuch as the spring 43 bears on the plunger 28 and through the spider 44 and the washers 45 and 46 acts on the rear of the plunger 30. A pin 47 screwed into the sleeve 27 may slide in a slot 48 formed in the plunger 30. However, if a fitting is held in the coupler, it will after a short relative travel prevent further relative travel of the plunger 30 and the sleeve 27. The spider 44 which is associated with the rear end of the plunger 30 is provided with an extension 49 which is adapted to contact with the ball 36 upon continued forward movement of the plunger 28 after the forward movement of the plunger 30 relative to the sleeve 27 is stopped. By reason of this contact the ball 36 will be moved from its seat and allow the passage of lubricant from the bore 25 through the bore 34 and the bore 32 into the lubricant pressure chamber 50 formed by a greatly enlarged bore in the front end of the plunger 28. Thence the lubricant may pass forward through passages described in detail into a bore 52 formed in the plunger 30 and thence into the lubricant pocket 54 at the extreme forward end of the plunger 30 from which it will be supplied to the fitting to be lubricated.

Surrounding the pipe 24 is a spring 56 which bears at its upper end as seen in Fig. 2 upon the annular guide 20 and at its lower end upon a stop member 57 secured to the conduit 24 by means of a screw 58. The spring 56 serves normally to return the parts to the position shown in Fig. 2 immediately after the handle 18 is released by the operator. It may be noted that inasmuch as the conduit 24 is joined to the plunger 28 by being screwed into the rear end thereof at the screw threads 31, the pipe 24 moves relatively to the casing 12 when the operator draws the handles 14 and 18 together to allow the lubricant to be fed to the nipple.

The first part of the operation of grasping the handles 14 and 18 serves to clamp the nipple to be lubricated resiliently in the outer end of the coupler. The outer end of the sleeve or clamping member 27 is formed (as is shown most clearly in Fig. 1) with a substantially circular opening 64 in one side of the sleeve, and with a slot-like opening 62 in the end of 63 thereof. A fitting may be positioned within the end of the coupler and the neck of the fitting may protrude through either of said openings, 62 or 64. The slot-like opening 62 in the outer end of the sleeve is too small to allow the insertion or withdrawal of the fitting but is large enough to allow the positioning of the neck of the fitting therein. The opening 64 on the side of the sleeve is of itself large enough to allow the passage of the fitting, but when the plunger 30 is in its outwardly extending position is not sufficiently large to allow the insertion of the fitting or its withdrawal without retraction of the plunger 30. Thus, with the parts as shown in the position of Fig. 2, the fitting to be lubricated whether in the position shown in full lines or in the position shown in dotted lines may be inserted through the opening 64, and it is clear that in either case the inlet opening will register with the pocket 54. Its neck may extend outward either through the opening 64 or through the slotlike opening 62. The ball head of the nipple will seat in depressions 65. Compression of the parts of the pliers to bring the handles 14 and 18 together causes by reason of the cam projections 40 and 42 forward movement of the plunger 28. Because of the spring 43, this causes the resilient forward movement of the plunger 30 until as shown in Fig. 3, the forward edge thereof contacts securely with the fitting to be lubricated. Thereafter, the spring 43 is compressed and the extension 49 of the spider 47 operates to move the ball valve 36 from its seat and allow the passage of lubricant as aforesaid through the bores and passages into the pocket 54 and thence into the nipple to be lubricated.

As also stated above I provide means whereby the lubricant pressure itself maintains the plunger or nozzle 30 securely in contact with the nipple to be lubricated, the spring 43 not being relied upon wholly for maintaining lubricant tight contact. Rearwardly of the plunger 30 within the lubricant pressure chamber 50, the leather washer 46, the metallic washer 45 and the spider 44 serve to substantially close the forward end of the pocket 50 and provide in a sense a piston on which the lubricant pressure in the pocket 50 acts to aid the spring 43 in driving the plunger 30 forward into firm contact with the fitting to be lubricated. It is to be especially noted that the size of the surface provided by the washers 45 and 46 and the spider 44 is larger than the surface of the fitting which will be covered by the pocket 54. Thus the force acting to maintain the plunger 30 in contact with the fitting is greater than the force acting to separate the plunger from the fitting. The spider 44 is provided with lateral inlets 66 shown most clearly in Figure 5, and with an axial port 68 through which lubricant may pass. The washers 45 and 46 are provided respectively with axial ports 70 and 72 through which the lubricant entering by the axial port 68 passes into the bore 52 of the plunger 30.

If desired, a screw 74 may be screwed into a side of the plunger 30 and protrude outwardly into a slot 76 formed in the sleeve-like forward extension of the plunger 28. This screw and slot allow relative movement between the plungers 28 and 30 throughout the useful range but also serve to limit the relative movement beyond the useful range.

It is believed that the operation of my improved coupler will be apparent from the above description. When it is desired to lubricate a nipple or fitting the operator places the clamp end of the coupler over the fitting to be lubricated so that the neck exends either through the opening 64 or the end opening 62 and so that the inlet opening of the fitting registers with the pocket 54. The fitting is normally urged into the recesses 65 by the spring 43 acting through the plunger 30. The operator thereupon closes his hand thus bringing the handle 18 nearer to the handle 14 and through the cam-like projections 40 and 42 moves the plunger 28 forward relative to the casing 12. The first part of this movement causes the plunger 30 to contact more firmly with the fitting and force the fitting more certainly into the depressions 65. As soon as the fitting is firmly secured, the plunger 30 ceases its relative forward movement but as the plunger 28 continues forward, the projection 49 on the spider 44 contacts with the ball valve 36 moving it from its seat. This allows the passage of lubricant forward from the bore 25 through the bore 34 and the bore 32 into the lubricant chamber 50. The lubricant pressure in the chamber 50 maintains the plunger 30 firmly in contact with the fitting and prevents leakage of lubricant notwithstanding high pressure which may be necessarily built up in the pocket 54 in order to force grease into the fitting. Lubricant moves forward from the chamber 50 through the lateral ports 66 and axial ports 68, 70 and 72 into the bore 52 and thence into the pocket 54. From the pocket 54, the lubricant is forced into the fitting to be lubricated. Release of the handle 18 allows the spring to move the handles to the relative position shown in Figure 2 whereupon the plungers 28 and 30 will be backed away from the fitting regardless of the lubricant pressure in the chamber 50.

Figure 7:
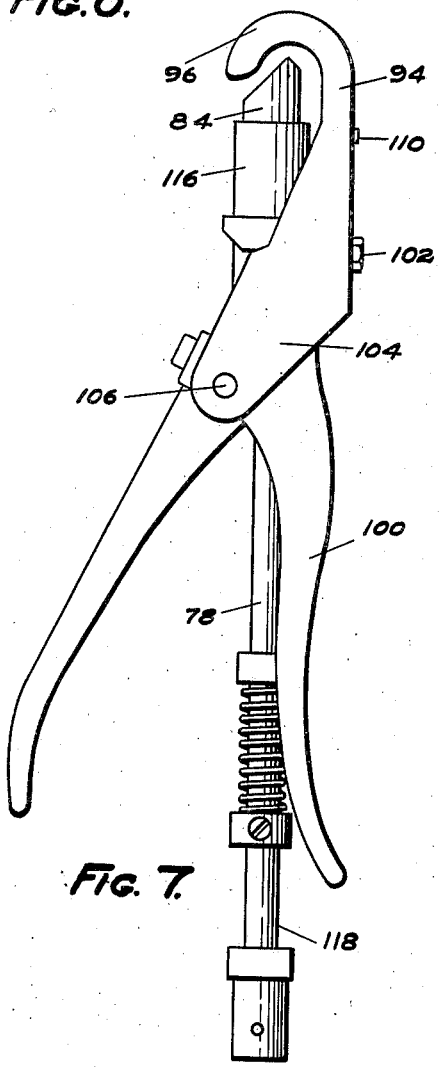
Figure 7 is a view in side elevation of the coupler shown in Figure 6.

The form of coupler shown in Figures 6 and 7 is very similar in construction and operation to the form shown in Figures 1 to 5, inclusive. It is provided with a pipe or conduit 78 through which lubricant may be supplied to the lubricant pressure chamber 80 to co-act with the spring 82 for urging the plunger 84 into contact with the head of the fitting to be lubricated. The plunger 84 is provided with an axial bore 86 through which lubricant may flow from the chamber 80 to the fitting and there is positioned in the chamber 80 a spider 88 having a rearward extension 90 for at times contacting with and unseating the ball valve 92. However, instead of providing a full sleeve in which the head of the fitting may be seated while it is being lubricated, in this form of coupler I merely provide a claw member 94 which has at its forward end 96 a pair of claws which are adapted to embrace the neck of the fitting and provide a seat for the head thereof. The claw member 94 extends rearwardly and is secured by means of a screw 102 to the body member or casing 98 with which the handle 100 is made integral. The claw member has a further rearward extension 104 through which a pivot pin 106 passes, the pin 106 also passing through a projection 108 formed on the body member 98. Screwed into the plunger is a pin 110 which is adapted to slide in slots 112 and 114 formed respectively in the claw member 94 and in a sleeve member 116. The rear end of the sleeve member 116 is internally threaded to receive the forward end of a plug 118 which forms a rearward wall for the chamber 80 and provides a rearward abutment for the spring 82, provides a housing and seat for the ball valve 92, and is at its rearward end internally threaded to receive the forward end of the lubricant conduit 78.

Figure 8:
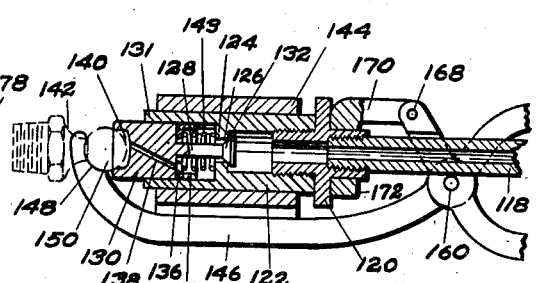
Figure 8 is a sectional view of a portion of a still different form of coupling device, parts of handles, etc., being broken away.
Figure 9:
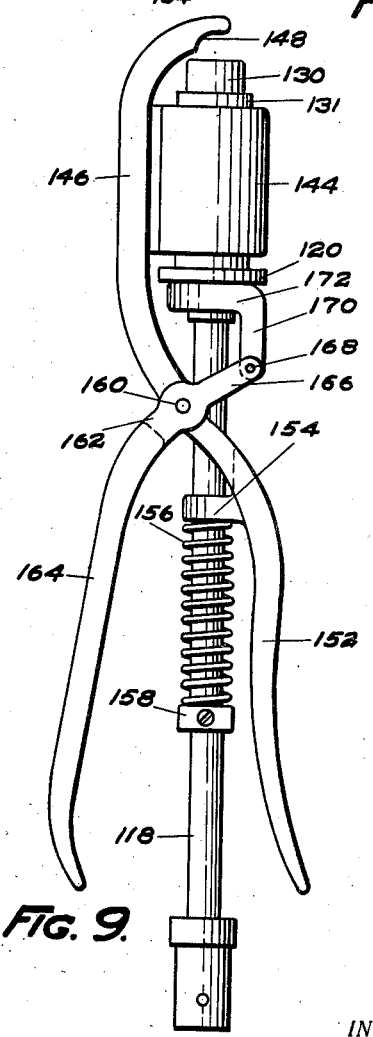
Figure 9 is a view in side elevation of the coupler shown in Figure 8.

The embodiment of my invention shown in Figures 8 and 9 is adapted for use with a lubricant conduit 118 having exterior threads at its outer end threaded into one end of a plug 120. The plug 120 is formed with exterior threads at its forward end and is threaded into the open end of a substantially hollow cylinder 122 formed with a web or partition 124 intermediate its ends and having an opening 126 in said web. Normally extending through the opening 126 is a rearward extension 128 of a plunger 130. Surrounding the rearward portion of the plunger 130 is the open ended forward extension 131 of the cylinder 122. The extension 128 has at its rearward end a beveled valve 132 which is adapted to seat upon a cooperating seat formed in the opening 126. Normally contacting with the rearward end of the plunger 130 and surrounding the extension 128 is a washer 134 having an offset opening 136 through which lubricant is adapted to pass from the chamber formed between the web 124 of the sleeve 122 and the washer 134. After passing through the opening 136 the lubricant is adapted to move forward through an inclined passageway 138 formed in the plunger 130 to the lubricant pocket 140 from which it passes into the fitting 142 to be lubricated. Surrounding the cylinder 122 is a tubular member 144 made integral with but offset from a clamping member 146 which maintains the parts previously described in assembled relationship with the clamping member and the handles provided for operating the coupler. The outer end of the clamping member 146 is provided with a rounded pocket 148 in which the ball head 150 of the fitting 142 is adapted to rest. The other end of the clamping member 146 is extended to form a handle 152. Formed integrally with the handle 152 is an annular guide 154 through which the conduit 118 passes and against which the upper end of the compression spring 156 is adapted to bear. The lower end of the spring 156 normally bears upon a stop member 158 secured to the conduit 118 in any desired position and manner. Between the handle 152 and the upper part of the clamping member 146 the member is enlarged and formed with a circular opening through which a pivot pin 160 passes. Also mounted on the pivot pin 160 is a co-operating member 162 formed with a handle 164 and with an oppositely extending arm 166 pivotally fastened at 168 to a lower extension 170 of a ring 172 which is adapted to surround the inner end of the plug 120 and bear against an enlargement thereof. Compression of the handles 152 and 164 causes a forward movement of the plunger 130 until it contacts with the head 150 of the fitting 142 whereupon the spring 143 becomes compressed and the valve 132 is moved from its seat to allow lubricant to pass forward into the lubricant pocket 140 and to lubricate the fitting. In its passage the lubricant pressure acting on the washer 134 aids in urging the plunger 130 forward to clamp the ball head 150 between the plunger 130 and the pocket 148.

Figure 10:
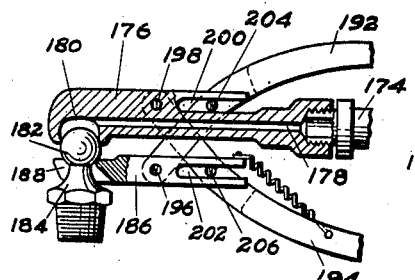
Figure 10 is a sectional view of a portion of another form of coupler, parts being broken away.
Figure 11:
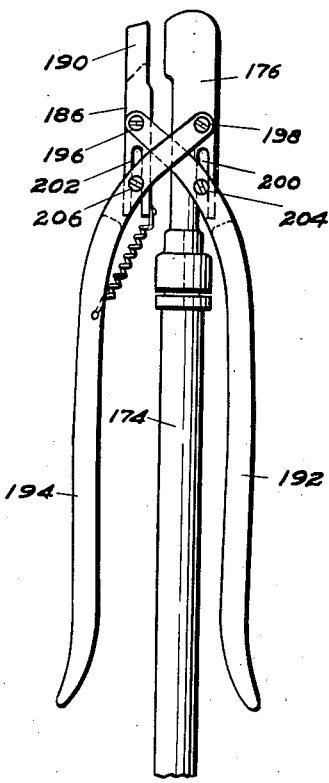
Figure 11 is a view in side elevation of the coupler shown in Figure 10.

In the form of coupler shown in Figures 10 and 11 the lubricant conduit 174 is connected with an upper clamping member 176 having a bore 178 leading forward to a lubricant pocket 180 which is adapted to cover a portion of the ball head 182 of the fitting 184. Adapted to contact with the under-side of the ball head 182 is a lower clamping member 186 having a pair of forwardly protruding claws 188 and 190 which are adapted to surround the neck of the fitting 184 and in moving toward the member 176 are adapted to clamp the ball head of the fitting securely between the members 176 and 186. A pair of handles 192 and 194 are provided for moving the members 176 and 186 toward each other. The handle 192 is pivotally connected at its forward end at 196 to the claw member 186 and the handle 194 is pivotally connected at its forward end at 198 to the clamping member 176. The members 176 and 186 are respectively formed rearwardly of the pivots 198 and 196 with a pair of longitudinally extending slots 200 and 202, respectively. Pins 204 and 206 secured respectively to the handles 192 and 194 are adapted to slide in the slots 200 and 202, and thus cause the members 176 and 186 to approach each other and clamp the ball head of the fitting between them. It is to be noted that in this embodiment of my invention, the clamping of the ball head is accomplished entirely by the manual operation of the handles, neither lubricant pressure nor spring pressure being relied upon to aid in the clamping action. Moreover the movement of the handles has no effect upon the flow of lubricant, it being necessary to provide an auxiliary valve to turn the lubricant supply on or off.

Figure 12:
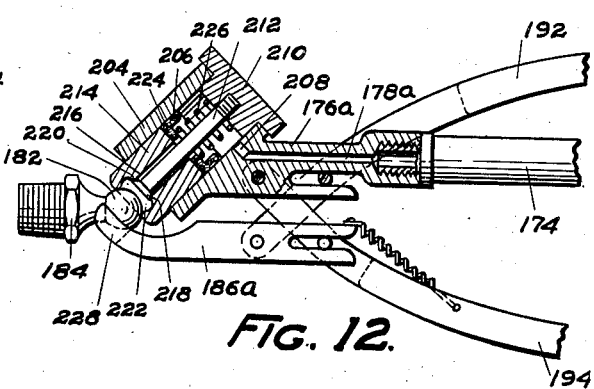
Figure 12 is a sectional view of a portion of still another form of coupler.
Figure 13:
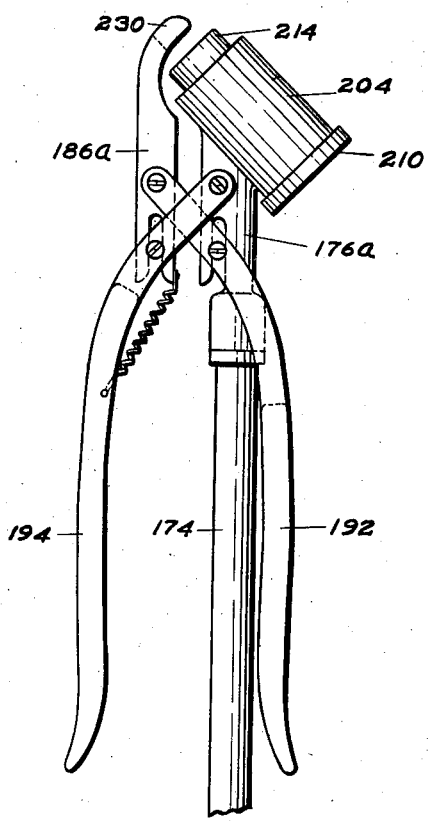
Figure 13 is a view in side elevation of the coupler shown in Figure 12.

The form of plier coupler shown in Figures 12 and 13 is to a large extent constructed exactly the same as the coupler shown in Figures 10 and 11. Therefore corresponding parts will be designated by like numerals and only unlike portions will be specifically described. Clamping member 176a is formed with an added tubular portion 204 having an enlarged cylindrical passage 206. The bore 178a is formed with an inclined portion 208 leading to the passage 206 so that lubricant is delivered to the interior of the tubular member 204. The rear end of the passage 216 is closed by means of a plug 210 into which the rear end of the valve stem 212 is secured. Mounted for sliding movement in the passage 206 is a plunger 214 which is provided with a bore 216 through which lubricant is adapted to pass for delivery to the ball head 182 of the fitting 184. The valve stem 212 extends forwardly through the bore 216 and has formed on its forward end a beveled valve member 218 which is adapted to seat on a conical surface 220 adjacent to the outer end of the plunger 214. Just in advance of the valve seat 220 the plunger 214 is provided with a lubricant pocket 222 from which the lubricant is adapted to enter directly into the ball head 182 of the fitting 184. Rearwardly of the plunger 214 within the chamber formed between it and the plug 210, there is provided a washer 224 upon which the forward end of a spring 226 is adapted to bear. The rearward end of the spring 226 bears on the plug 210 and the spring thus acts to resiliently urge the plunger 214 forward to clamp the ball head 182 against the lower clamping member 186a. The lower clamping member 186a is formed similarly to the member 186, shown in Figs. 10 and 11, except that the clamping fingers 228 and 230 are curved to properly coact with the angular inclination of the plunger 214. The lubricant chamber formed between the washer 224 and the plug 210 acts similarly to the manner already described to aid in clamping the ball head of the fitting within the jaws. The initial closing of the handles causes the plunger 214 to contact resiliently with the ball head of the fitting. Further closing of the handles moves the plunger 214 rearwardly compressing the spring 226, thus moving the valve seat 220 away from the valve head 218 and opening the valve to allow lubricant to be supplied to the pocket 222 and to the fitting to be lubricated.

The operation of the forms of my invention shown in Figs. 6 to 13, inclusive, is substantially the same as that of the form of my invention shown in Figs. 1 to 5, inclusive. The operator inserts the fitting to be lubricated within the socket provided therefore, closes the handles of the plier coupler and thus causes a plunger or other clamping member to contact with the fitting to be lubricated and hold it in the socket while lubricant is being supplied through bores provided in the various clamping members. In the forms of the devices shown in Figs. 6, 7, 8, 9, 12, and 13, a plunger member such as 84, is resiliently urged into contact with the fitting and further movement of the handles causes a movement of the plunger relative to the casing which opens a valve and allows grease to be supplied to the fitting. The supply of lubricant furthermore aids the spring in securely clamping the fitting within the socket.

It is to be understood that the above described embodiment of the invention is for the purpose of illustration only and various changes may be made therein without departing from the spirit and scope of the invention.

I claim:

1. A coupler for servicing a fitting to be lubricated comprising, means for supplying lubricant, a valve for controlling the supply of lubricant to the coupler, resilient means for clamping the fitting in the coupler, and unitary means operable subsequent to the initial engagement of the coupler with a fitting to substantially simultaneously move the resilient clamping means into a position where it may be effective to resiliently clamp a fitting and to open the valve.

2. A coupler for servicing a fitting to be lubricated comprising, a casing, means for supplying lubricant to said casing, a clamp for securing said fitting within said coupler, resilient means for actuating said clamp, lubricant pressure actuated means dependent on said lubricant supply in operation to aid in actuating said clamp, a pair of handles associated with said casing one of which is movable relative to the other, and means responsive to relative movement of said handles for controlling said lubricant supply and for actuating said resilient means.

3. A coupler for servicing a fitting to be lubricated comprising, a casing, a valve for controlling the supply of lubricant to said casing, a resilient clamp for securing said fitting within said coupler, a handle associated with said casing, and means responsive to movement of said handle relative to said casing for controlling said valve and for controlling said resilient clamp.

4. A coupler for servicing a fitting to be lubricated comprising, a casing, means for supplying lubricant to said casing, a valve for controlling said lubricant supply, a clamp for securing said fitting within said coupler, resilient means for actuating said clamp, lubricant pressure actuated means for actuating said clamp, a pair of handles associated with said casing, and means responsive to relative movement of said handles for controlling said valve said resilient means and said lubricant pressure actuated means.

5. A coupler for servicing a fitting to be lubricated comprising, a casing, means for resiliently clamping said fitting to said coupler, a pair of handles associated with said casing, one of which is pivotally mounted with respect to the other, and means responsive to relative movement of said handles for operating said clamping means.

6. In a clamp type coupler for servicing a fitting to be lubricated, a casing, means for supplying lubricant to said casing, means actuated by lubricant pressure for aiding in clamping said fitting to said coupler, a pair of handles associated with said casing, and means operated by relative movement of said handles for admitting lubricant under pressure to said lubricant pressure actuated clamping means.

7. A coupler for servicing a fitting to be lubricated comprising, a casing, a pair of plungers mounted in said casing, both of said plungers being formed with longitudinal bores, a valve associated with one of said plungers for at times closing the bore therein, a spring also associated with said plunger for at times resiliently holding said valve closed, and means comprising a projection associated with the other said plunger arranged to engage the valve at times to move said valve to an open position.

8. A coupler for servicing a fitting to be lubricated comprising, a coupling member, a lubricant pressure operated clamping means carried by said coupler providing a pressure cylinder and a clamping member mounted in the cylinder, a valve for admitting fluid under pressure to said cylinder, an operating member movably mounted on said coupling member and having a cam formed thereupon associated with said clamping means whereby movement of the operating member may cause the clamping movement of said clamping member prior to the admission of lubricant under pressure into said cylinder.

9. A coupler for servicing a fitting to be lubricated comprising, a casing, a tubular plug secured in said casing and formed with a longitudinal bore, means for supplying lubricant to said plug, a valve mounted in the bore of said plug, a spring associated with said valve for normally maintaining said valve closed, a plunger mounted in said casing, a spring interposed between said plug and said plunger, and means associated with said plunger for selectively opening said valve.

10. A coupler for servicing a fitting to be lubricated comprising, a clamping member formed with a longitudinal bore, a second clamping member associated therewith, and means for moving one of said clamping members laterally toward and from the other said clamping member and for maintaining said members always in parallel relationship with each other.

11. A coupler for servicing a fitting to be lubricated comprising, a cylinder, a clamping member formed with a longitudinal bore mounted for reciprocation in said cylinder, a second clamping member positioned adjacent thereto, and means for moving said members laterally toward and from each other and for maintaining said members always in parallel relationship with each other, said cylinder having its longitudinal axis inclined at an acute angle relative to both of said clamping members.

12. A coupler for servicing a lubricant receiving fitting comprising, a casing, means within said casing and actuated by lubricant pressure for clamping said fitting in said coupler, a valve for admitting lubricant under pressure to said lubricant pressure clamping means, and an operating member carried by said casing for mechanically operating said clamping means and for opening said valve.

13. A coupler for servicing a lubricant receiving fitting comprising, means actuated by lubricant pressure for clamping said fitting in said coupler, a valve for admitting lubricant under pressure to said lubricant pressure clamping means and a manually operable member for mechanically operating said clamping means and for subsequently causing said valve to open.

14. A coupler for servicing a lubricant receiving fitting comprising, a lubricant conduit, a member carried by the conduit for receiving said fitting, a lubricant pressure operated plunger for clamping said fitting between said member and said plunger, a valve for controlling the admission of lubricant under pressure to said plunger, and means for first mechanically urging said plunger toward said fitting and subsequently opening said valve.

15. A coupler for servicing a lubricant receiving fitting comprising, a clamping member adapted clampingly to engage a lubricant fitting, a valve for controlling the passage of lubricant through the coupler into the fitting, a movable operating member for operating said clamping member and said valve, and means forming a lost motion connection between said clamping member and said valve whereby the clamping member is caused to function prior to the opening of said valve upon the actuation of said operating member.

JOHN L. CREVELING.